(12) United States Patent
Sohn et al.

(10) Patent No.: US 8,010,911 B2
(45) Date of Patent: Aug. 30, 2011

(54) COMMAND INPUT METHOD USING MOTION RECOGNITION DEVICE

(75) Inventors: Jong Moo Sohn, Daejeon (KR); Jae Cheol Sim, Daejeon (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1108 days.

(21) Appl. No.: 11/604,488

(22) Filed: Nov. 27, 2006

(65) Prior Publication Data
US 2007/0124703 A1    May 31, 2007

(30) Foreign Application Priority Data
Nov. 29, 2005 (KR) .................. 10-2005-0114569

(51) Int. Cl.
*G06F 3/033* (2006.01)
(52) U.S. Cl. ........................ 715/863; 715/762
(58) Field of Classification Search .......... 345/156, 345/158; 715/863
See application file for complete search history.

(56) References Cited

U.S. PATENT DOCUMENTS

| | | | |
|---|---|---|---|
| 5,796,406 A * | 8/1998 | Shigematsu et al. | 715/863 |
| 5,953,735 A * | 9/1999 | Forcier | 715/273 |
| 6,259,382 B1 | 7/2001 | Rosenberg | |
| 6,567,101 B1 | 5/2003 | Thomas | |
| 7,657,849 B2 * | 2/2010 | Chaudhri et al. | 715/863 |
| 2005/0243062 A1 * | 11/2005 | Liberty | 345/158 |
| 2008/0174550 A1 * | 7/2008 | Laurila et al. | 345/158 |

FOREIGN PATENT DOCUMENTS

| | | |
|---|---|---|
| JP | 2000-176868 | 6/2000 |
| KR | 1020020035386 | 5/2002 |
| KR | 1020040108218 A | 12/2004 |
| KR | 102050025837 | 3/2005 |
| KR | 1020050052555 | 6/2005 |
| WO | WO 2006/090197 A1 * | 8/2006 |

* cited by examiner

*Primary Examiner* — My-Chau T Tran
(74) *Attorney, Agent, or Firm* — Ladas & Parry LLP

(57) ABSTRACT

A command input method makes use of a three-dimensional motion recognition device embodied with an inertia system and is particularly directed to extend the total number of inputable commands using initial posture information as well as movement pattern of a motion recognition device. The command input method includes the steps of: determining initial posture at start point when movement of the motion recognition device is generated; determining a pattern of the movement at the end of the movement; and deciding a command from the determined initial posture and the movement pattern. Since the three-dimensional spatial motion can be further differentiated into different commands by the initial posture of the input device, the command input system can be simplified in structure with less number of recognizable motions.

18 Claims, 4 Drawing Sheets

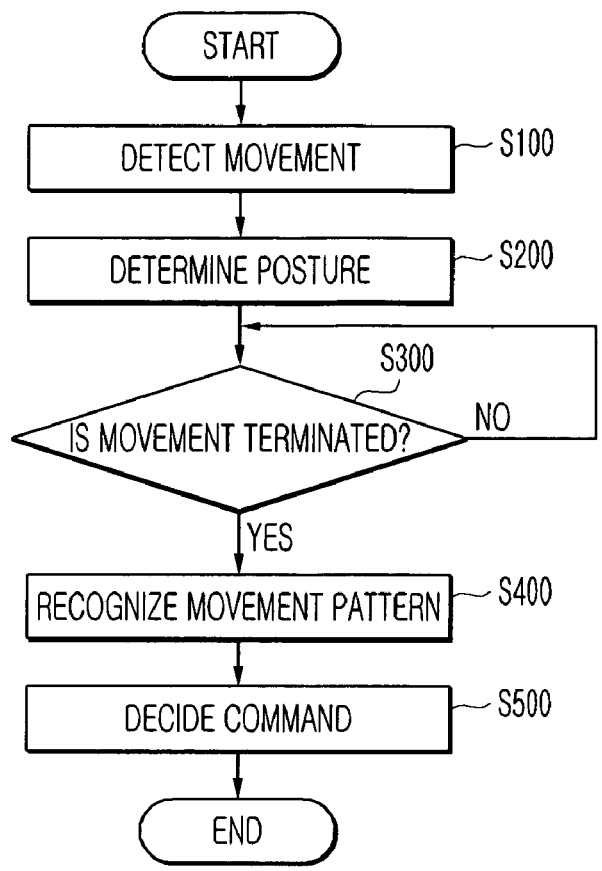

FIG. 3

| POSTURE OF MOTION RECOGNITION DEVICE | RECOGNIZED MOVEMENT PATTERN | DECIDED COMMAND |
|---|---|---|
| A | FBF/FBFB | MENU ACTIVATION |
| A | L/LR | LEFT |
| A | R/RL | RIGHT |
| A | U/UD | UP |
| A | D/DU | DOWN |
| A | F/FB | SELECTION |
| A | LRL/LRLR | BACK |
| A | BFB/BFBF | END |
| B | F/FB | PLAY/PAUSE |
| B | B/BF | STOP |
| B | R/RL | CHANNEL UP |
| B | L/LR | CHANNEL DOWN |
| B | U/UD | VOLUME UP |
| B | D/DU | VOLUME DOWN |
| B | DUD/DUDU | MUTE |
| B | RLR/LRLR | FORWARD (Skip) |
| B | LRL/LRLR | REWIND (Replay) |
| C | SHAKE HORIZONTALLY AT LEAST THREE TIMES | RING WAKE-UP/ SLEEP |
| C | SHAKE VERTICALLY AT LEAST THREE TIMES | POWER ON/OFF |

- U: Up
- D: Down
- L: Left
- R: Right
- F: Forward
- B: Backward
- UDU: Up + Down + Up

FIG. 4

| POSTURE OF MOTION RECOGNITION DEVICE | RECOGNIZED MOVEMENT PATTERN | DECIDED COMMAND |
|---|---|---|
| A | 0 | 0 |
| | ⋮ | ⋮ |
| | 9 | 9 |
| | ㄱ | ㄱ |
| | ⋮ | ⋮ |
| | ㅎ | ㅎ |
| | ㅏ | ㅏ |
| | ⋮ | ⋮ |
| | ㅣ | ㅣ |
| B | 0 | 0 |
| | ⋮ | ⋮ |
| | 9 | 9 |
| | A | A |
| | ⋮ | ⋮ |
| | Z | Z |
| C | F/FB | ! |
| | ⋮ | ⋮ |
| | DUD/DUDU | ? |
| | LRL/LRLR | EN/en |
| | SHAKE HORIZONTALLY AT LEAST THREE TIMES | RING WAKE-UP/ SLEEP |
| | SHAKE VERTICALLY AT LEAST THREE TIMES | CHARACTER INPUT ON/OFF |

300

- U: Up
- D: Down
- L: Left
- R: Right
- F: Forward
- B: Backward

- UDU: Up + Down + Up

COMMAND INPUT METHOD USING MOTION RECOGNITION DEVICE

CROSS-REFERENCE TO RELATED APPLICATION

This application claims priority to and the benefit of Korean Patent Application No. 2005-114569, filed Nov. 29, 2005, the disclosure of which is incorporated herein by reference in its entirety.

BACKGROUND

1. Field of the Invention

The present invention relates to a command input method using a three-dimensional motion recognition device embodied with an inertia system, and more particularly, to a command input method capable of increasing the total number of commands using a movement pattern as well as initial posture information in a motion recognition device.

2. Discussion of Related Art

Together with generalization of new, various digital media and appearance of various terminal devices compatible therewith, various input devices are being introduced and used. Existing portable input devices include a remote controller, a keyboard, and a mouse. However, the existing input devices are characterized by their complexity of use and restriction in a physical space, and thus the devices and/or their functions are being gradually replaced by new input devices. Such a phenomenon is remarkable, particularly, in a small-size terminal device.

Using one of input devices expected to substitute the existing input devices useful value itself, a study has been made of methods and devices for recognizing and analyzing the spatial motion of a user and giving a command to a target device.

There are various methods for detecting movement in a three-dimensional space. One of them is to photograph a moving object using a camera, and analyze movements by processing the object image. In this case, a plurality of cameras is required, and a user should use the object having a particular shape or color for the image processing. In addition, the image processing is complicated and has to be used in a restricted space. Thus, the method is inappropriate to be used as an input method of a portable device.

Another method uses a principle of triangulation. This method is to fix a device for transmitting/receiving a radio or ultrasonic wave instead of a camera at a specific position, measure variation of the radio or ultrasonic wave when a target device moves within the coverage of the transmitting/receiving device, and to trace the trajectory of the target object. This method is only possible when used in a restricted space, and it is difficult to be applied to cases involving minute movement.

For other methods, a device with an integrated inertia system is used. For concrete example, there are pen type pointing devices used to detect movements in a three-dimensional space using combination of a three-axis angular velocity sensor, a three-axis accelerometer, and a three-axis velocity sensor. Each of these devices is connected wirelessly to a computer, transmits variation of an angular velocity, which is caused by inclination and movement thereof, to the computer, and moves a mouse pointer of the computer or creates trajectory for handwriting recognition.

As another example, there is a pen type input device using a three-axis accelerometer and a three-dimensional optical recognition device. This input device determines the contactness of the device with a predetermined physical plane (e.g. a table) and an angle thereof, using the three-dimensional optical recognition device, and extracts trajectory based on movement of a pen by reflecting posture information of the measured device on acceleration information generated by movement.

As yet another example, there is a small-size ring type input device using a two-axis accelerometer. The input device measures an acceleration based on finger movement on a predetermined physical plane, and analyzes movement trajectory of a user. In other words, the input device detects a signal generated when a finger gets in contact with a predetermined surface and a signal generated when the finger leaves the surface using the two-axis accelerometer, double-integrates acceleration value of the signal duration therebetween, extracts movement trajectory of the finger, and uses extracted information as pointing information of a computer. This expansion makes possible application such as handwriting recognition.

The methods using the camera, the triangulation, and the inertia system commonly project the user's movement onto the trajectory of the two-dimensional plane, and have the projected trajectory correspond to motion of the control target. In certain cases, a physical two-dimensional plane is essential. Accordingly, it is possible to recognize less number of motions than the number of motions directly recognized in the three-dimensional space. Therefore, there is disadvantage in that the total number of available motions is remarkably reduced.

In the case where the number of the trajectories projected onto the two-dimensional plane is increased to overcome this limitation, the complexity and the total number of the trajectories are increased, thereby causing a limitation of making it difficult not only to embody an algorithm for trajectory recognition but also for the user to memorize the trajectories.

Accordingly, in the methods using the inertia system, there is disadvantage in that the complexity of the motion recognition is increased due to various correction techniques for increased accuracy of the final trajectory to facilitate the recognition process and for increased number of distinguishable motions, and due to the algorithm for the trajectory projection onto the two-dimensional plane. Due to the increasing complexity in motion recognition, there is a disadvantage in that a collection of the available motions should be minimized.

SUMMARY

The present invention is directed to a motion recognition-based command input method that can be executed in a simple structure.

The present invention is also directed to a motion recognition-based command input method for extending a collection of available motions that can recognize motion in a three-dimensional space.

The present invention is also directed to a motion recognition-based command input method for facilitating user's memorization of motion through a consistent motion collection extension method.

An aspect of the present invention is to provide a command input method using a motion recognition device, the method including the steps of: determining the initial posture of the motion recognition device at the beginning of the movement; determining the pattern of the movement at the termination point of the movement; and deciding a command from the determined initial posture and the movement pattern.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is a flowchart illustrating a command recognition procedure of a command input method according to an exemplary embodiment of the present invention;

FIG. 2 is a diagram illustrating a command decision mapping table for performing a command input method according to an exemplary embodiment of the present invention;

FIG. 3 is a diagram illustrating a command decision mapping table for performing a command input method applied to a remote controller according to another exemplary embodiment of the present invention;

FIG. 4 is a diagram illustrating a command decision mapping table for performing a command input method applied to character recognition according to yet another exemplary embodiment of the present invention.

DETAILED DESCRIPTION OF EXEMPLARY EMBODIMENTS

Figure 5:
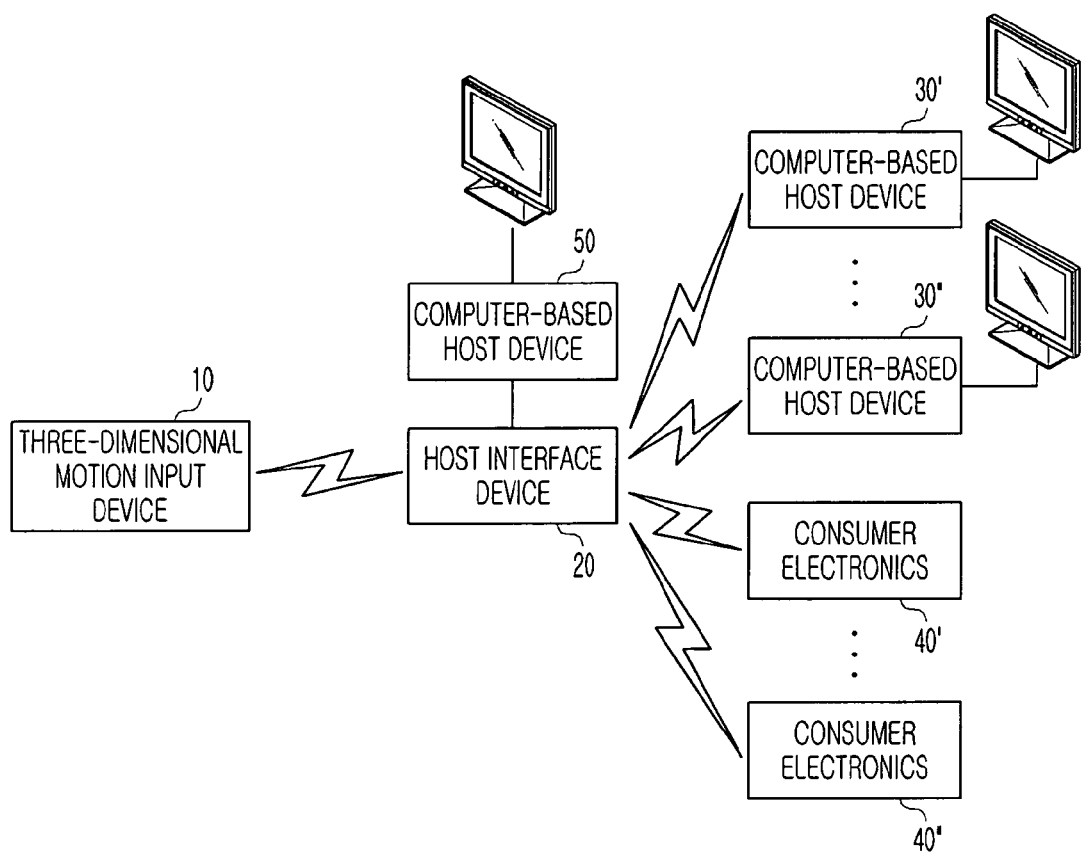
FIG. 5 is a diagram illustrating a construction of an input device system for performing a command input method according to an exemplary embodiment of the present invention.

Hereinafter, exemplary embodiments of the present invention will be described in detail. However, the present invention is not limited to the exemplary embodiments disclosed below, and can be implemented in various modified forms. Therefore, the present exemplary embodiments are provided for complete disclosure of the present invention and to fully inform the scope of the present invention to those of ordinary skill in the art.

First, an input system for performing a command input method according to the spirit of the present invention will be described. FIG. 5 illustrates a construction of an input system using a three-dimensional accelerometer, wherein the input device performs a command input method according to an exemplary embodiment of the present invention. The input system includes a three-dimensional motion recognition device 10 that is carried by a user and transmits movement information of the user wirelessly; a host interface device 20 that extracts meaningful motion information from the movement information of the user and transmits corresponding information by wire or air; a plurality of computer-based host devices 30' and 30" that are connected with the host interface device 20 by wire or air; and a plurality of consumer electronics 40' and 40" that are connected with the host wirelessly. Herein, the term "movement" refers to a user's indication signal through the three-dimensional motion recognition device, and signifies a meaningful motion section.

Embodiment

An operation according to an exemplary embodiment of the present invention will be described with reference to FIG. 1. A control command input method as shown is performed using an output variation of the three-dimensional motion recognition device carried by or attached to a user. The input method includes the steps of detecting a start point of movement of the motion recognition device (S100); determining initial posture of the motion recognition device at the start point (S200); monitoring an end point of the movement of the motion recognition device (S300); determining the pattern of the movement at the terminating point of the movement (S400); and deciding a command from the initial posture and the movement pattern (S500).

In the step of detecting the movement (S100), a start of the movement is detected by pressing a button housed in the three-dimensional motion recognition device embodied with the inertia system, or by detecting a sudden change of movement energy detected by the inertia system. The latter case will be described in detail. In view of a characteristic of human motion in which it is substantially impossible to perform uniform motion having zero acceleration, a point of time when the acceleration is zero can be determined as a stop state. Subsequently, a minute acceleration change under a predetermined threshold level can be regarded as a continuous stop state, and a point of time when the acceleration change is over the threshold level can be determined as the start of the movement.

In the step of determining the posture (S200), a posture of the three-dimensional motion recognition device is determined just before or after the detected movement start point in the movement detecting step (S100). The posture of the motion recognition device uses gravity acting on the inertia system housed in the motion recognition device. In this process, reference data for converting a device coordinate system based on a direction fixed about the device into a gravity coordinate system can be generated. When the posture just before the movement start point is determined, it is possible to obtain more precise reference data and perform easier execution as compared to when the posture soon after the movement start point is determined. Further, after the posture determining step (S200), though not illustrated, there can be preformed an additional step of monitoring the movement of the motion recognition device and recording a measurement value (e.g., an acceleration value) of the movement energy measured on a predetermined time basis so as to be used as basis data for determination in the subsequent step of recognizing the movement pattern (S400) and/or the step of deciding the command (S500).

In the step of detecting the movement end (S300), as in the movement detection step (S100), the movement end point is detected by un-pressing a button housed in a three-dimensional input device embodied with an inertia system, or by detecting no-variation (e.g., acceleration of zero) of the movement energy detected in the inertia system.

In the step of deciding the command according to the movement of the motion recognition device, movement information ranging from the movement start point detected in the movement detecting step (S100) to the movement end point detected in the movement end detecting step (S300) is extracted as a meaningful motion section, the extracted movement information is corrected using the initial posture and converted into movement on the gravity coordinate system, and then the converted movement is recognized as meaningful motion.

In other words, the above process includes the steps of detecting the movement pattern of the motion recognition device on a device-fixed coordinate system (S400), and deciding a control command corresponding to the movement pattern of the motion recognition device (S500). This is the simplest motion recognition and command decision process. In order to extend of the number of input commands or to increase user's convenience, initial posture of the motion recognition device based on the gravity direction is applied in the control command deciding step (S500). In the motion deciding step (S500), the posture of the three-dimensional input device stored in the posture determining step (S200) is combined with the motion recognized in the motion recognition step (S400), thereby deciding final motion.

Further in step S400, one of a plurality of motion recognizers, which are separately provided, can be selected using the initial posture information, and the movement on the gravity coordinate system irrespective of the initial posture can be recognized as the motion using the selected motion recognizer. In this case, there is a burden of cost caused by the plurality of motion recognizers, but there is an advantage in that the motion recognition process gets simpler and thus gets more precise since the number of motion recognized by each motion recognizer gets less.

Detailed embodiments of the command input method according to the spirit of the present invention will be described below. In the embodiments, the initial posture obtained from the posture determining step (S200) is applied for extension of an input command set. In other words, in the following embodiments, one motion recognized in the movement recognizing step (S400) can be recognized as different motions, depending on the posture of the posture determining step (S200).

It is assumed that the three-dimensional input device embodied using the inertia system has a finger wearable ring shape, and a simple function of the remote controller is performed using the three-dimensional input device. On the assumption that a moving body coordinate system is consistent with the gravity coordinate system when a right hand wears the ring and a right palm directs to the ground, it can be appreciated that, when the right palm directs to the left, the moving body coordinate system is not consistent with the gravity coordinate system, thereby turning the ring wearing hand by 90 degrees. As such, the posture can be generally classified as three postures using the palm's direction before movement for the motion recognition. In other words, in the circumstance where the right hand wears the ring, the palm directs to the ground (posture A), the palm directs to the left (posture B), and the palm directs to the sky (posture C).

Then, if the user keeps his/her posture and takes movement for the motion recognition, its resultant output value of the inertia system is used to calculate the movement on the gravity coordinate system. In other words, the initial posture is used to convert the movement on the moving body coordinate system into the movement on the gravity coordinate system, thereby providing the movement independent of the posture. For example, when the user takes a motion for moving to the left, the taken motion is recognized as "leftward movement" on the gravity coordinate system irrespective of the initial posture.

The recognition process can selectively use the following methods: one method for recognizing motion by calculating the trajectory of the input device from output of the inertia system and determining the motion from the calculated trajectory; another method for recognizing motion by using acceleration, velocity trajectory and so on as inputs of an algorithm such as an artificial neural network; and yet another method for recognizing simple motion by detecting a peak of raw data such as acceleration. A reference for the selection can be precision of original data, complexity of the motion, complexity of the calculation, performance of a calculator, and so on.

The recognized motion pattern is combined with the initial posture, and the combination maps to the final motion. In this case, a corresponding table of FIG. 2 can be considered as a kind of mapping table. The corresponding table 100 includes an input device posture column 101 for storing the posture of the hand wearing the input device; a column 102 for the motion recognized on the gravity coordinate system irrespective of the posture; and a column 103 for the final decided motion.

An example capable of being constructed to perform a function of a simple remote controller using the corresponding table 100 is a remote controller mapping table 200 as shown in FIG. 3. In other words, the posture A is used as motion classifier for a navigation function of a basic menu, the posture B is used as motion classifier for channel and volume control functions, and the posture C is used as motion classifier for a special additional function. As a result, even though the actual number of user's motions is merely a few, the collection of the whole motions can be extended using the initial posture information of the hand wearing the device.

Accordingly, the corresponding table 200 can be used by freely modified/extended to suit any control target.

An embodiment for inputting characters using the three-dimensional input device will now be described with reference to FIG. 4.

FIG. 4 illustrates an embodiment of a mapping table 300 for a handwriting input function. In the same way as the foregoing, an initial posture is determined on the basis of three postures (the posture A where the palm directs to the ground, the posture B where the palm directs to the, and the posture C where the palm directs to the sky). The three postures are used with distinction for inputting Korean characters (called Hangeul), English characters, special characters, and control functions. In other words, in the case of the posture A, all movements after the initial posture are recognized as Hangeul consonant and vowels, and numeric digits, thereby deciding final motion. In the case of the posture B, all movements are recognized as English alphabets and numeric digits, thereby deciding final motion. In the case of the posture C, movements after the initial posture are recognized as a change between upper case/lower case of the English character, marks (a pause mark, a period mark, an exclamation mark, a question mark, and a bracket), and wake-up/sleep state of the three-dimensional input device, thereby deciding the final motion.

Motion recognizers can be embodied as physically distinguished modules for each Hangeul, the English character, and the control. After each module recognizes the motion based on its activation caused by the recognized initial posture, it can also obtain final results with reference to the mapping table 300.

In the case of the posture C, the user may not be easy to perform a character input motion. Thus, the user can use a method for, in a control target device performing character input, providing the user with separate graphical use interface (GUI) feedback and selecting contents viewed on a screen through simple directional movements rather than through spatial character input.

In the case where a left-handed person uses the motion recognition device, the above mapping table can be additionally provided for the left-handed person, and a method for selecting one of two corresponding tables using a separate setting flag is used to overcome, and the left/right-handed person setting flags can be selected by the user at the initialization of the three-dimensional input device.

Utilization of the present invention for identifying Hangeul consonant and vowel inputs according to another embodiment will be described below.

When the Hangeul is input using the three-dimensional motion input device, the initial posture just before the motion is used to identify whether input motion is vowel or consonant. In other words, the initial posture just before the movement is classified as at least two postures (postures A and B). When the initial posture is the posture A, the user's motion is recognized as the consonant input and, when the initial posture is the posture B, the user's motion is recognized as the vowel input, thereby deciding final Hangeul consonant/vowel.

Utilization of the present invention for identifying the English character and the Korean character according to yet another embodiment will be described below.

One grapheme or alphabet of English or Korean is comprised of one or more strokes. Accordingly, in order to form one perfect grapheme, it is required to combine a plurality of strokes. In order to identify whether newly input strokes are included in a currently input grapheme or in the next grapheme, the motion initial posture for inputting the stroke is classified as at least two postures (postures A and B), and the following graphemes are distinguished by varying the initial posture with respect to each grapheme. In other words, a first grapheme is formed by inputting and combining all strokes in the posture A, a second grapheme is formed by inputting strokes in the posture B, and a third grapheme is formed by inputting strokes again in the posture A. In other words, one grapheme is completed by several movement patterns distinguished on the basis of the start and end points of the movement. Thus, a plurality of movement pattern sets constituting one grapheme should be distinguished. In this embodiment, the pattern sets are distinguished depending on information of the initial posture.

A motion collection extension method simultaneously using the inertia system and an image recognition system according to still yet another embodiment will be described below.

The user wears the input device in which the inertia system is housed on his/her hand. The image recognition system is provided to detect, extract, and recognize user's hand movement into an image. The input device worn on the user's hand outputs and transmits the hand posture to the image recognition system. A recognition result of the image recognition system is generated when the user's hand moves is combined with posture information transmitted from the input device worn on the user's hand, thereby deciding the final motion.

For example, assuming that the input device housing the inertia system therein is mounted on the back of a hand, and the image recognition system installed on a ceiling monitors an image on a floor, when the posture is maintained to direct the palm to the bottom, it is not recognized to be a motion recognition section based on the image and, when the palm directs to the ceiling or the left/right, it is recognized to be the motion recognition section based on the image. In the image recognition system, when the palm directs to the ceiling, an image of a palm shape is recognized and, when the palm directs to the left/right, an image of a knifehand is recognized, thereby simplifying an image recognition algorithm. In the case where palm directions are different from each other, but the motion trajectories are the same, the motions are recognized to be different from each other depending on the palm direction, thereby providing more motions with less number of two-dimensional images.

As described above, the present invention has an effect that, since the three-dimensional spatial motion can be further differentiated into different commands by the initial posture of the input device, the command input system can be simplified in structure with less number of recognizable motions.

Further, the present invention has an effect of facilitating embodiment of the motion recognizer by using the separate motion recognizer according to each initial posture.

Furthermore, the present invention has an effect of extending the total number of available motion collections even by use of a small number of motions easily memorizable and posable by the user.

Furthermore, the present invention has an effect of facilitating the user's memorization of the motions by consistently classifying overall motions by the initial posture.

Furthermore, the present invention has an effect of improving speed of the character input by utilizing the initial posture of the input device to distinguish between the character graphemes at the time of the character input.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A command input method using a three dimensional inertia based motion recognition device (MRD) coupled to a host interface device (HID), the method comprising:
   wearing the MRD as a ring;
   transmitting signals from the MRD to the host interface device (HID) wherein the transmitted signals correspond to three-dimensional inertia changes of the MRD;
   detecting a level of the transmitted signals;
   determining that the MRD is substantially motionless when the detected level of the transmitted signals is below a predetermined threshold level;
   detecting an initial posture of the MRD when the MRD is sensed to be substantially motionless;
   determining that the MRD is in motion when the detected level of the transmitted signals is above the predetermined threshold level;
   using the transmitted signals that are determined to be above the predetermined threshold level to determine a pattern of movement of the MRD;
   determining by the HID a final input command based on the combination of the detected initial posture and the determined pattern of the movement of the MRD, wherein the determining uses a mapping table that stores final input commands designated by the combination of the detected initial posture and the determined pattern of the movement of the MRD.

2. The method according to claim 1, further comprising monitoring and recording by the HID the pattern of movement of the MRD.

3. The method according to claim 1, further comprising sensing the level of the transmitted signals is below the predetermined threshold level, after the level of the transmitted signals was determined to be above the predetermined threshold level, to sense the pattern of movement of the MRD is completed.

4. The method according to claim 1, further comprising predetermining the predetermined threshold level of the transmitted signals.

5. The method according to claim 1, wherein the input command is processed by transmitting the input command from the HID to a computer-based host device (CBHD) to control the CBHD via movement of the MRD.

6. The method according to claim 1, wherein the input command is processed by transmitting the input command from the HID to a consumer electronic device (CED) to control the CED via movement of the MRD.

7. The method according to claim 1, wherein the MRD has a button housed on the MRD for use in indicating a beginning and an end of the pattern of movement of the MRD.

8. The method according to claim 1, wherein the HID monitors the movement of the MRD on a predetermined time basis to recognize the pattern of movement of the MRD.

9. The method according to claim 1, wherein the determined pattern of movement of the MRD corresponds to either a Hangeul consonant input command or a Hangeul vowel input command depending on the initial posture of the MRD.

10. The method according to claim 1, wherein the determined pattern of movement of the MRD corresponds to either a Korean grapheme input command or an English grapheme input command depending on the initial posture of the MRD.

11. A command input method using a three dimensional inertia based motion recognition device (MRD) coupled to a host interface device (HID), the method comprising:
   wearing the MRD as a ring;
   transmitting signals from the MRD to the host interface device (HID) wherein the transmitted signals correspond to three-dimensional inertia changes of the MRD;
   pressing on a button housed in the MRD to indicate to the HID that the MRD is initiating a pattern of movement and to detect an initial posture of the MRD in the pattern of movement;
   detecting a level of the transmitted signals;
   determining that the MRD is substantially motionless when the detected level of the transmitted signals is below a predetermined threshold level;
   detecting an initial posture of the MRD when the MRD is sensed to be substantially motionless;
   determining that the MRD is in motion when the detected level of the transmitted signals is above the predetermined threshold level;
   using the detected transmitted signals above the predetermined threshold level to determine a pattern of movement of the MRD;
   processing by the HID an input command correlated to the combination of the detected initial posture of the MRD and the determined pattern of movement of the MRD, wherein the determining uses a mapping table that stores final input commands designated by the combination of the detected initial posture and the determined pattern of the movement of the MRD.

12. The method according to claim 11, further comprising monitoring and recording by the HID the determined the pattern of movement of the MRD.

13. The method according to claim 11, further comprising un-pressing the button housed in the MRD to indicate to the HID an end to the pattern of movement of the MRD.

14. The method according to claim 11, wherein the input command is processed by transmitting the input command from the HID to a computer-based host device (CBHD) to control the CBHD via movement of the MRD.

15. The method according to claim 11, wherein the input command is processed by transmitting the input command from the HID to a consumer electronic device (CED) to control the CED via movement of the MRD.

16. The method according to claim 12, wherein the HID monitors the movement of the MRD on a predetermined time basis to recognize a movement pattern of the MRD.

17. The method according to claim 11, wherein the determined pattern of movement of the MRD corresponds to either a Hangeul consonant input command or a Hangeul vowel input command depending on the initial posture of the MRD.

18. The method according to claim 11, wherein the determined pattern of movement of the MRD corresponds to either a Korean grapheme input command or an English grapheme input command depending on the initial posture of the MRD.

* * * * *